(12) United States Patent
Cooper et al.

(10) Patent No.: US 11,731,347 B2
(45) Date of Patent: Aug. 22, 2023

(54) METHOD OF MANUFACTURING A THREE-DIMENSIONAL ARTICLE

(71) Applicant: 3D Systems, Inc., Rock Hill, SC (US)

(72) Inventors: Guthrie Cooper, Mill Spring, NC (US); John D. Clay, Charlotte, NC (US)

(73) Assignee: 3D SYSTEMS, INC., Rock Hill, SC (US)

( * ) Notice: Subject to any disclaimer, the term of this patent is extended or adjusted under 35 U.S.C. 154(b) by 66 days.

(21) Appl. No.: 17/518,152

(22) Filed: Nov. 3, 2021

(65) Prior Publication Data

US 2022/0055291 A1    Feb. 24, 2022

Related U.S. Application Data

(62) Division of application No. 16/455,052, filed on Jun. 27, 2019, now Pat. No. 11,192,294.

(Continued)

(51) Int. Cl.
*B29C 64/153* (2017.01)
*B33Y 10/00* (2015.01)
(Continued)

(52) U.S. Cl.
CPC ............ *B29C 64/135* (2017.08); *B29C 64/25* (2017.08); *B29C 64/268* (2017.08);
(Continued)

(58) Field of Classification Search
CPC .......... B29C 2033/0005; B29C 64/135; B29C 64/153; B29C 64/386; B29C 64/393;
(Continued)

(56) References Cited

U.S. PATENT DOCUMENTS

| 6,241,934 B1 | 6/2001 | Everett et al. |
| 6,323,477 B1 * | 11/2001 | Biasing ................. G01N 21/94 |
| | | 250/208.1 |

(Continued)

FOREIGN PATENT DOCUMENTS

| DE | 1999395617 | 3/2001 |
| WO | 0114125 | 3/2001 |
| WO | 2017187147 | 11/2017 |

OTHER PUBLICATIONS

European Patent Communication for European Application No. 19740255.5 dated Feb. 4, 2022 (6 pages).

(Continued)

*Primary Examiner* — Leo B Tentoni

(57) ABSTRACT

A three-dimensional printing system for solidifying a photocurable resin in a layer-by-layer manner at a build plane includes a scan module, a transparent plate, a sensor, and a controller. The scan module is configured to scan the light beam along two axes to address the build plane. The transparent plate is positioned in the optical path between the scan module and the build plane. The transparent plate has at least one reflective feature in the optical path. The sensor is mounted above the glass plate and is positioned to receive light reflected from the reflective feature. The controller is configured to operate the scan module to scan the light beam across the build plane, receive a signal from the sensor when the light beam impinges upon the reflective feature, and analyze the signal to verify a proper alignment of the light beam to the build plane.

18 Claims, 9 Drawing Sheets

Related U.S. Application Data

(60) Provisional application No. 62/691,100, filed on Jun. 28, 2018.

(51) Int. Cl.

| | |
|---|---|
| *B33Y 50/02* | (2015.01) |
| *G01N 21/94* | (2006.01) |
| *B29C 64/135* | (2017.01) |
| *B33Y 50/00* | (2015.01) |
| *B29C 64/386* | (2017.01) |
| *B29C 64/268* | (2017.01) |
| *B29C 64/25* | (2017.01) |
| *B29C 64/393* | (2017.01) |
| *G01N 21/958* | (2006.01) |
| *B29C 33/00* | (2006.01) |

(52) U.S. Cl.
CPC .......... *B29C 64/386* (2017.08); *B29C 64/393* (2017.08); *B33Y 50/00* (2014.12); *G01N 21/958* (2013.01); *B29C 2033/0005* (2013.01)

(58) Field of Classification Search
CPC ......... B33Y 10/00; B33Y 50/00; B33Y 50/02; G01N 21/94; G01N 21/958
USPC .............................. 264/401, 497; 356/237.3
See application file for complete search history.

(56) References Cited

U.S. PATENT DOCUMENTS

| | | | |
|---|---|---|---|
| 2013/0001834 A1 | 1/2013 | El-Siblani et al. | |
| 2017/0341183 A1* | 11/2017 | Buller | B29C 64/153 |
| 2017/0035517 A1 | 12/2017 | Buller et al. | |
| 2020/0070408 A1* | 3/2020 | Elsey | B29C 64/393 |

OTHER PUBLICATIONS

PCT International Search Report the International Searching Authority for PCT/US2019/039548, dated Oct. 4, 2019 (5 pages).
PCT Written Opinion of the International Searching Authority for PCT/US2019/039548, dated Oct. 4, 2019 (6 pages).

* cited by examiner

SCANNING SYSTEM BLOCK DIAGRAM

METHOD OF MANUFACTURING A THREE-DIMENSIONAL ARTICLE

CROSS-REFERENCE TO RELATED APPLICATIONS

This non-provisional patent application claims priority to U.S. Non-Provisional application Ser. No. 16/455,052, now U.S. Pat. No. 11,192,294 B2 which claims priority to U.S. Provisional Application Ser. No. 62/691,100, Entitled "THREE-DIMENSIONAL PRINTING SYSTEM WITH INTEGRATED SCAN MODULE CALIBRATION" by Guthrie Cooper, filed on Jun. 28, 2018, incorporated herein by reference under the benefit of U.S.C. 119(e).

FIELD OF THE INVENTION

The present disclosure concerns an apparatus and method for the digital fabrication of three-dimensional articles of manufacture by a layer-by-layer solidification of a build material. More particularly, the present disclosure concerns an system enabling continuous calibration of scan optics within a three-dimensional printing system.

BACKGROUND

Three-dimensional printers are in wide use. A number of different three-dimensional printing systems utilize lasers for a layer-by-layer solidification of a build material into a three-dimensional article. Challenges with lasers include a need for alignment and calibration. This is particularly true when a new laser is installed. Such an installation typically requires the skills of a highly trained technician. Also, laser-based systems tend to experience a "drift" of alignment and calibration over time with a resultant loss of quality in manufacturing three-dimensional article. There is a need for a practical solution to reduce a cost of maintenance to make high quality manufacturing practical.

SUMMARY

Figure 1:
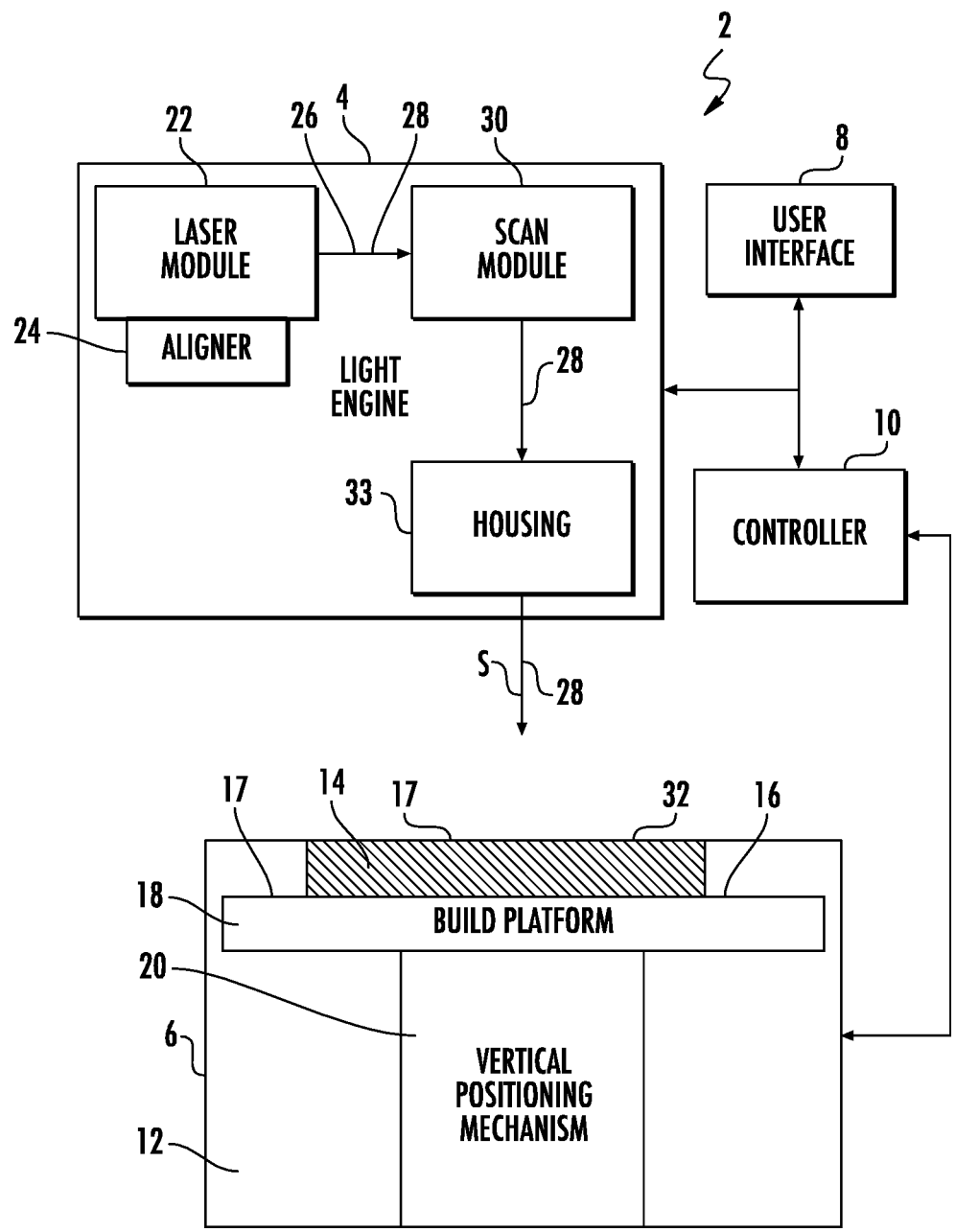
FIG. 1 is a block diagram schematic of an embodiment of a three-dimensional printing system incorporating various calibration techniques.

In an aspect of the disclosure, a three-dimensional printing system has a laser module for solidifying a photocurable build material in a layer-by-layer manner at a build plane. The three-dimensional printing system includes a scan module, a transparent plate, a sensor, and a controller. The scan module is configured to receive the light beam and to scan the light beam along two axes to address the build plane. The transparent plate is positioned in the optical path between the scan module and the build plane. A reflective feature is disposed on or proximate to the transparent plate. The sensor is mounted above the glass plate and is positioned to receive light reflected from the reflective feature. The controller is configured to operate the scan module to scan the light beam across the build plane, receive a signal from the sensor when the light beam impinges upon the reflective feature, and analyze the signal to verify a proper alignment of the light beam to the build plane.

In one implementation the reflective feature includes a plurality of reflective features. The reflective features can be arrayed across the glass plate.

In another implementation the light beam impinges upon the glass plate with a diameter $D_l$. The reflective feature has a lateral dimension d. The diameter $D_l$ can be at least ten times d or at least 100 times d.

In yet another implementation the three-dimensional printing system includes a housing for protecting the scan optics from vapors generated during solidification of the photocurable resin. The housing has an opening for allowing the light beam to reach the build plane. The opening is closed by the transparent plate which provides a dual function of blocking the vapors and providing the reflective feature for calibration. A resin vessel contains the photocurable resin and includes a motorized build platform. The build plane is defined proximate to an upper surface of photocurable resin within the resin vessel. The controller is configured to operate the scan module and the motorized platform to manufacture a three-dimensional article. The controller can verify or correct alignment concurrently with the manufacturing.

In a further implementation, the three-dimensional printing system includes an inclinometer mounted in fixed relation to the glass plate. The controller analyzes a signal from the inclinometer in order to determine a tilt angle of the housing with respect to a gravitational reference. The controller can be configured to provide instructions to a user interface for leveling the housing based upon the determination. The controller can be configured to automatically compensate for the tilt angle when manufacturing the three-dimensional article.

In another implementation a reflective feature is disposed below the transparent plate so that light reflected from the reflective feature passes through the transparent plate before reaching the sensor. The controller can determine a power level of light reaching the sensor. The controller can estimate an effect of a resin film that has accumulated on a lower side of the transparent plate based upon the power level determination. The controller can adjust a level of energy delivered by the laser module in compensation for an attenuation loss through the resin film. The controller can send and alert or message to a user interface when an attenuation of the resin film reaches a threshold level.

DETAILED DESCRIPTION OF THE PREFERRED EMBODIMENTS

FIG. 1 is a block diagram schematic of an embodiment of a three-dimensional printing system 2 incorporating various calibration techniques. Three-dimensional printing system includes a light engine 4, a resin vessel 6, and a user interface 8 all coupled to a controller 10.

The resin vessel 6 contains photocurable resin 12 for forming a three-dimensional article 14 upon a top surface 16 of a build platform 18. The build platform 16 is vertically positioned in the resin 12 by a vertical positioning mechanism 20.

The light engine 4 includes a laser module 22 coupled to an aligner 24. Aligner 24 provides mechanical support, positioning, and alignment for laser module 22. The laser module 22 emits a light beam 26 that travels along a main optical path 28. The main optical path 28 is defined by laser module 22 and scan module 30. The main optical path 28 ends at a build plane 32 which is proximate to a top surface of the three-dimensional article 14.

The scan module 30 scans the light beam 26 along two substantially perpendicular lateral directions (X and Y) to define the build plane 32. The scan directions are substantially perpendicular to a propagation direction S of the light beam 26. The scan module is mounted to a base housing 33. The base housing 33 defines an opening 34 (FIG. 2) that allows the light beam to pass out of the light engine 4 and to the resin vessel 6. Along the main optical path 28 between the laser module 22 and the build plane 32 the light beam 28 converges from an initial diameter to a final diameter at the build plane 32. In one embodiment, the build plane 32 is at a point of focus for the light beam 28. However, the laser module 22 can include optics to controllably vary a diameter of the light beam 28 at the build plane 32.

The three-dimensional article 14 is manufactured with a layer by layer process under control of controller 10: (1) The vertical positioning mechanism 20 is operated to position an active surface 17 (initially the top surface 16 of the build platform 18) at build plane 32. (2) A layer of uncured resin 12 is provided over the active surface 17. (3) The laser module 22 and scan module 30 are operated to selectively cure a layer of the three-dimensional article 14 onto the active surface 17. (4) Steps (1)-(3) are repeated to complete manufacture of the three-dimensional article 14. Thus, the material layers of cured resin are accreted onto the active surface 17 in a layer-by-layer manner.

The user interface 8 can be used by the user to input commands and to receive information from the controller 10. In one embodiment the user interface 8 is integrated into a chassis of the three-dimensional printing system 2. In other embodiments, the user interface 8 is part of a physically separated computer that can include one or more of a smartphone, a laptop computer, a desktop computer, a tablet computer, or any other device. The user interface 8 can communicate with the controller 10 using a wireless or wired connection.

The commands input into the user interface 8 can be for calibration or manufacture of the three-dimensional article 14. The information can include a status, error, or calibration information and can occur during formation of a three-dimensional article 14 or during a calibration routine. The information can be displayed on the user interface 8 and/or stored in a form that can be used later such as in records of a database or spreadsheet.

In an alternative embodiment, the resin vessel includes a transparent sheet defining a lower surface. The build platform supports a lower facing surface of the three-dimensional article in facing relation with the transparent sheet. The build plane is defined proximate to a lower face of the three dimensional article. The light engine is configured to emit light upwardly through the transparent sheet and to the build plane to accretively form layers onto the lower face. The light engine can include a light source and a spatial light modulator.

Figure 2:
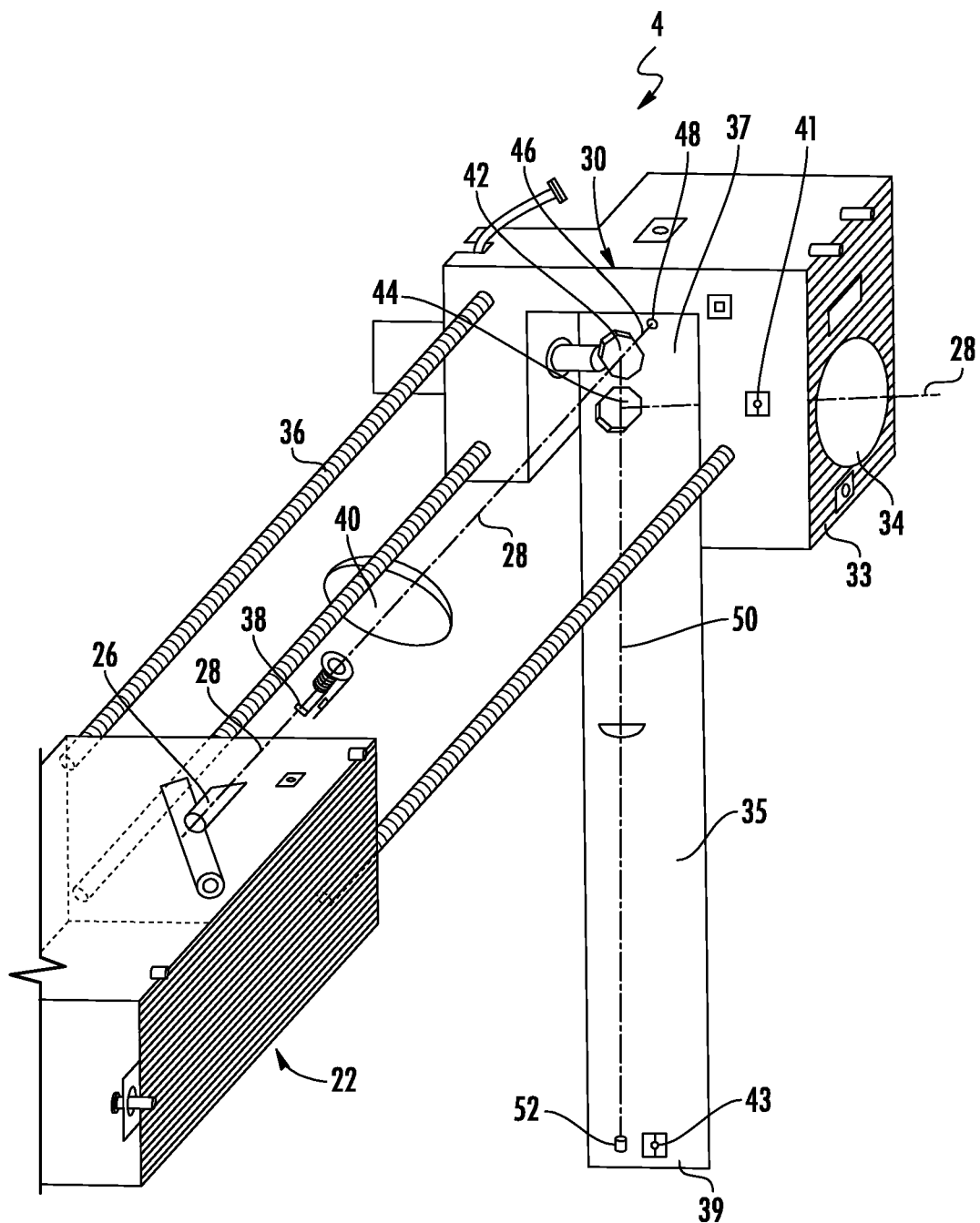
FIG. 2 is an isometric illustration of an embodiment of a light engine.

FIG. 2 is an isometric illustration of an embodiment of the light engine 4. The laser module 22 is coupled to the scan module 30 with precision rods 36. Between the laser module 22 and the scan module 30 is a small diameter concave lens 38 and a large diameter convex lens 40.

The scan module 30 includes a motorized X-mirror 42 and a motorized Y-mirror 44. The X-mirror scans the light beam 26 along an X-axis and the Y-mirror scans the light beam 26 along a Y-axis to address the build plane 32. The main optical path 28 extends from the laser module 22, through lenses 38 and 40, to the X-mirror 42, to the Y-mirror 44, through the opening 34, and to the build plane 32 (FIG. 1). Between the laser module 22 and the build plane 32, the light beam 26 converges along the optical path 28. Stated another way, a diameter of the light beam 26 decreases along the optical path 28 toward the build plane 32. In one embodiment, the light beam has a focal point and minimum beam diameter at the build plane 32. However, the controller 10 can move the lens 38 to control a diameter and degree of focus of the beam at the build plane 32.

For purposes of calibration there are at least two secondary optical paths. The main optical path 28 reflects from X-mirror 42 and from Y-mirror 44. A secondary optical path 46 extends through the X-mirror 42 to an X-sensor 48. Another secondary optical path 50 extends through the Y-mirror and to a Y-sensor 52. The secondary optical paths 46 and 50 will be described in more detail infra.

The scan module 30 is mounted to base housing 33. Also mounted to the base housing 33 is a cantilevered support 35 that extends from a proximal end 37 to a distal end 39. The scan module 30 is mounted at the proximal end 37. The secondary optical path 50 is defined along the cantilevered support between the Y-mirror 44 and the Y-sensor 52. A sensor 41 is mounted at the proximal end 37 to receive internal (internal meaning originating from within the printing system 2) vibrations generated by the scan module 30. The sensor 41 provides a signal to the controller 10 that is indicative of the internal vibrations. Sensor 41 can be a multi-axis accelerometer. A sensor 43 is mounted at the distal end 39 so as to be sensitive to vibrations originating from sources that are external to the three-dimensional printing system 2. The sensor 43 provides a signal to the controller 10 that is indicative of the vibrations at sensor 43. Sensor 43 can be a multi-axis accelerometer. In one implementation, the controller 10 can utilize a signal from sensor 52 to analyze vibrations from external sources and so there may be no need for sensor 43. In another implementation, the controller 10 utilizes signals from both sensors 43 and 52 to analyze the external vibrations.

Figure 3:
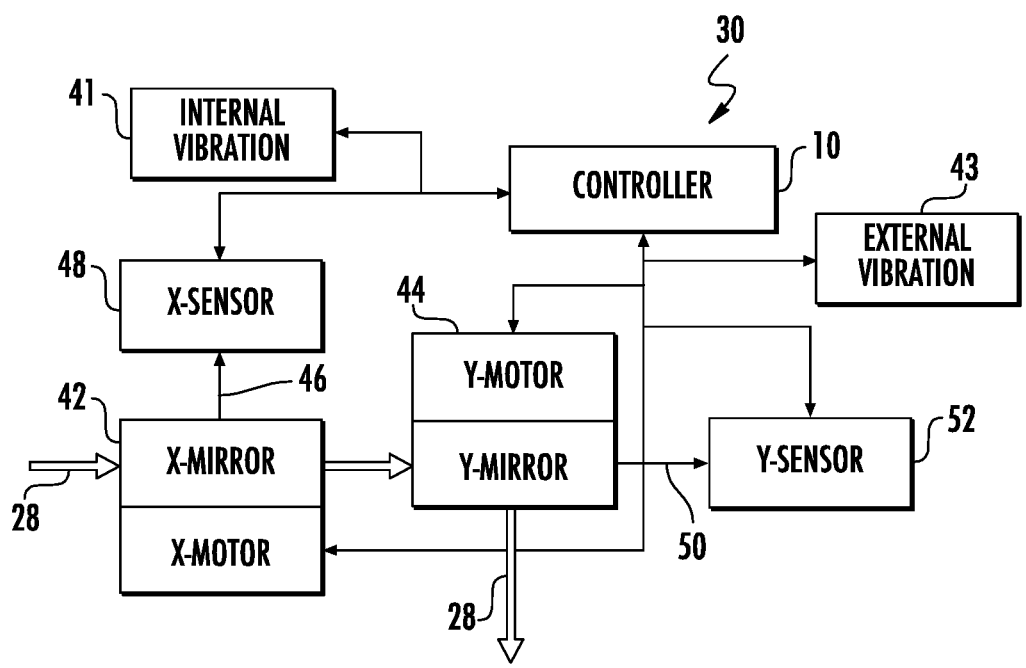
FIG. 3 is an electrical block diagram illustrating a scanning system for scanning a light beam over a build plane.

FIG. 3 is an electrical block diagram including the scanning system 30 illustrating the controller 10 coupled to the motorized X-mirror 42, X-sensor 48, the motorized Y-mirror 44, and the Y-sensor 52. Also illustrated is the primary optical path 28 and the secondary optical paths 46 and 50. Sensor 41 that senses internal vibrations is shown coupled to controller 10. Sensor 43 that senses external vibrations is also shown coupled to controller 10.

Figure 4:
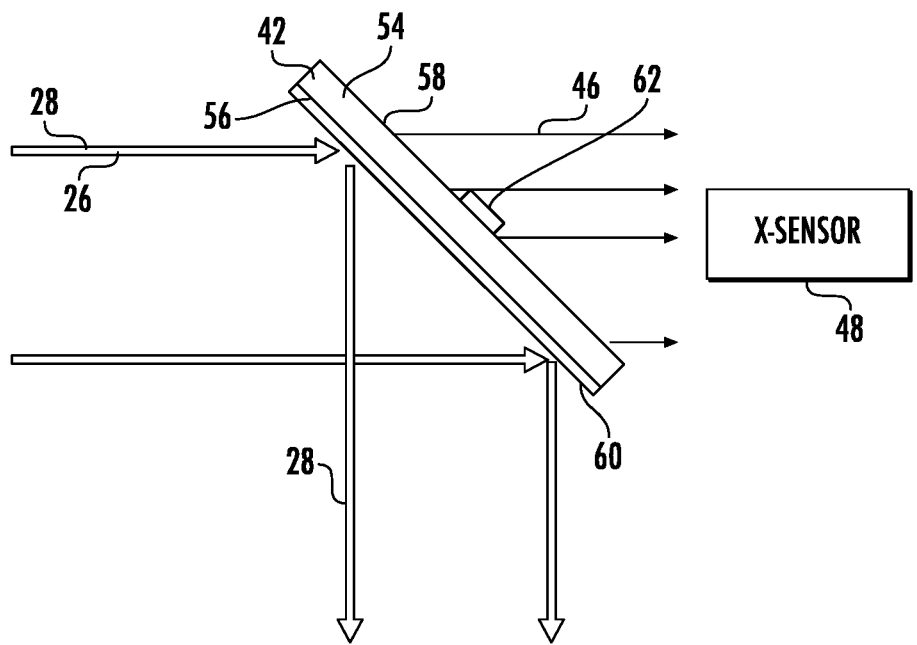
FIG. 4 is a schematic diagram illustrating a portion of a scanning system including an X-mirror and an X-sensor.

FIG. 4 is a schematic diagram illustrating a portion of the scan module 30 including the X-mirror 42 and the X-sensor 48. The X-mirror has a substrate 54 having a front side 56 and a back side 58. The front side 56 has an optical coating 60. The back side 58 has an opaque feature 62.

The optical coating 60 reflects at least 90% of the optical power of the light beam 26 along the main optical path 28.

The X-mirror 42 transmits no more than 10% of the optical power of the light beam 26 along the secondary optical path 46. In a more particular embodiment, the X-mirror 42 transmits between 0.1% and 4% of the optical power of the light beam 26 along the secondary optical path 46. In a yet more particular embodiment, the X-mirror 42 transmits between 0.2% and 2% of the optical power of the light beam 26 along the secondary optical path 46. In a further embodiment, the X-mirror 42 transmits about 1% of the optical power of the light beam 26 along the secondary optical path 46.

In the illustrated embodiment the opaque feature 62 is a small dot of reflective material that is centrally located relative to the transmitted optical path 46. The result is that the X-sensor receives a lowered intensity light beam with a shadow from the opaque feature 62. The location of the shadow with respect to the transmitted light beam along path 46 is indicative of an alignment of the light beam relative to the scanning system 30.

Figure 5:
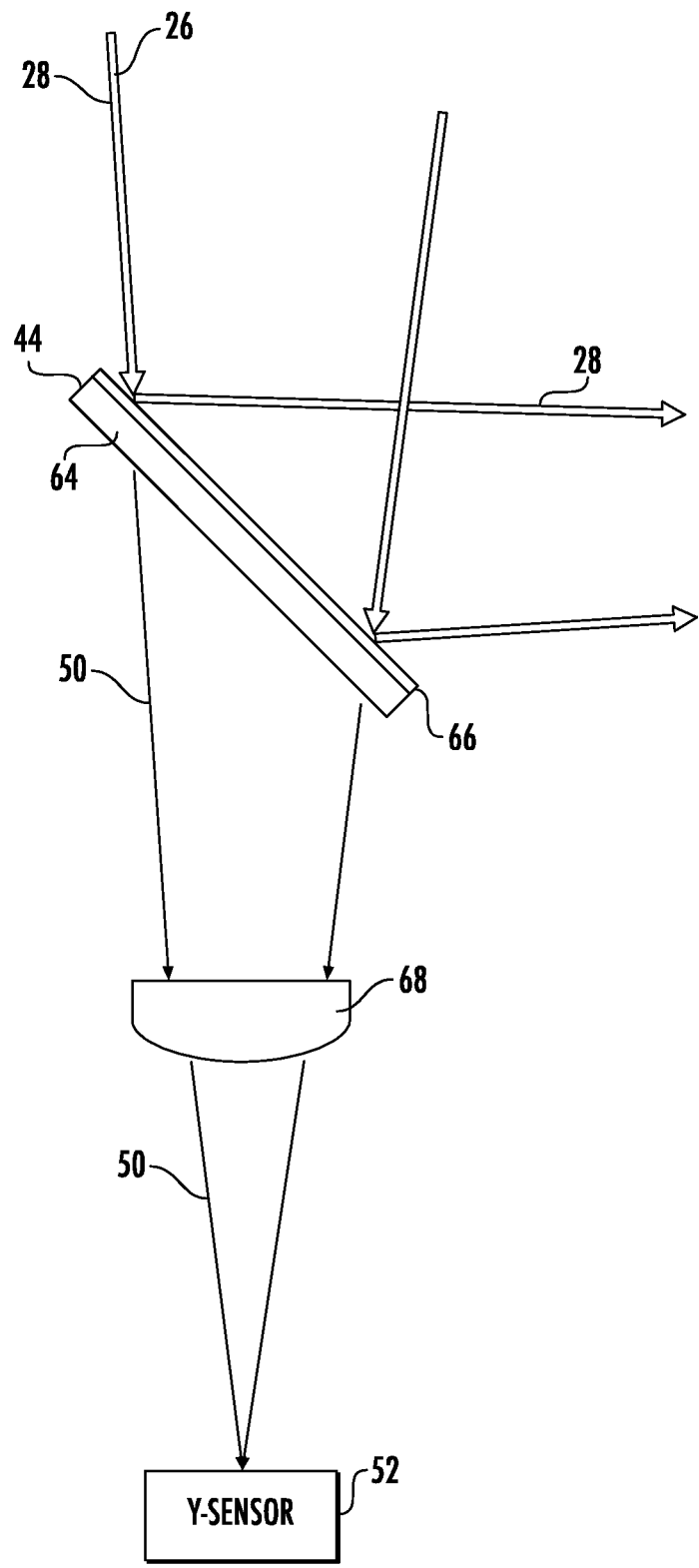
FIG. 5 is a schematic diagram illustrating a portion of a scanning system including a Y-mirror and a Y-sensor.

FIG. 5 is a schematic diagram illustrating a portion of the scanning system 30 including the Y-mirror 44 and the Y-sensor 52. The Y-mirror 44 has a substrate 64 an optical coating 66. The optical coating reflects at least 90% of the optical power of the light beam 26 along the main optical path 28. The Y-mirror transmits no more than 10% of the optical power of the light beam 26 along the secondary optical path 50. In a more particular embodiment, the Y-mirror 44 transmits between 0.1% and 4% of the optical power of the light beam 26 along the secondary optical path 50. In a yet more particular embodiment, the Y-mirror 50 transmits between 0.2% and 2% of the optical power of the light beam 26 along the secondary optical path 50. In a further embodiment, the Y-mirror 50 transmits about 1% of the optical power of the light beam 26 along the secondary optical path 50.

From the Y-mirror 44, both the reflected and transmitted portions of the light beam 26 converge. In the illustrated embodiment, the diameter of the beam at the Y-sensor is the same as the diameter at the build plane 32. The converging lens 68 is included in order to shorten the physical path length between the Y-mirror and the Y-sensor 52. In a particular embodiment, the light beam has a focused minimum diameter at the build plane 32 and the Y-sensor 52. An alternative embodiment does not include converging lens 68. Then the physical optical path length between the Y-mirror and the build plane 32 is the same as the physical optical path length between the Y-mirror and the Y-sensor 52.

The Y-sensor 52 is a camera or other sensor that captures a profile of the transmitted portion of beam 26. Because the beam diameter at sensor 52 is the same as at the build plane 32, the resultant profile is a good indicator of how well focused the beam 26 is upon build plane 32. The controller 10 is configured to analyze the profile and to determine a degree of the focus of laser module 22 upon the build plane 32.

Figure 6:
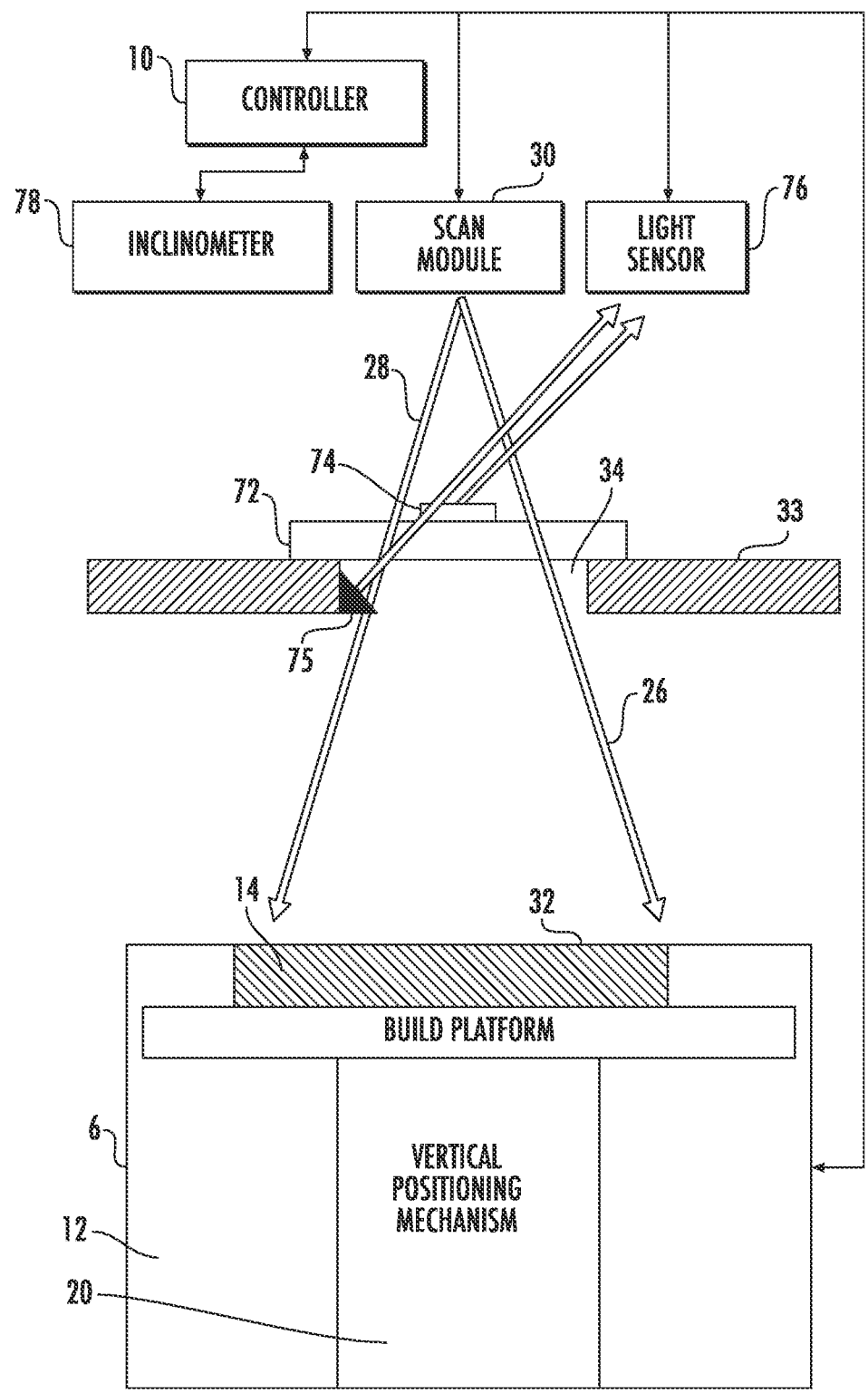
FIG. 6 is a schematic block diagram of a portion of a three-dimensional printing system.

FIG. 6 is a schematic diagram of a portion of the three-dimensional printing system 2 for illustrating a last portion of the main optical path 28 from the scan module 30 to the build plane 32. During the manufacture of the three-dimensional article 14, fumes are generated. The scan module 30 is protected from the fumes by the base housing 33. The base housing 33 includes opening 34 for allowing the scanning beam 26 to fully address the build plane 32. In some embodiments, the opening 34 is a precision opening.

The opening 34 is closed by a transparent plate 72. The transparent plate 72 provides two functions. First, it protects the scan module 30 from the fumes. Second, it provides calibration features for aligning the optical path 28 to the build plane 32. The transparent plate 72 includes a reflective feature 74. As the light beam 26 is scanned across build plane 32, it sometimes impinges on the reflective feature 74. Light is then reflected from reflective feature 74 up into light sensor 76.

In an illustrative embodiment, the reflective feature 74 includes an array of small dots or lines of reflective material with known locations corresponding to the build plane 32. As the light beam 26 impinges upon these small dots 74 the controller 10 receives signals indicative of reflected light received by sensor 76. The controller 10 uses this information to correlate operating of the scan module 30 with build plane coordinates. In some embodiments, sensor 76 is an arrangement or array of sensors 76 for capturing light reflected from different dots. Also, sensor 76 can represent different sensors optimized for different kinds of measurement. One kind of measurement can be based upon presence and/or trajectory of a light beam. Another kind of measurement can be based upon a power level.

The small dots 74 are much smaller than a diameter of the converging light beam 26 as it impinges upon the transparent plate 72. In one embodiment, the light beam diameter (at impingement) is at least ten times an axial dimension of a small dot 74. In other embodiments, the light beam diameter at least 100 times or at least 1000 times the diameter of the small dot 74. The small dots 74 therefore have no significant effect on the light beam 26 insofar as properly solidifying the resin 12 at build plane 32.

In the illustrated embodiment, reflective feature 74 is disposed on an upper surface of the transparent plate 72. In an alternative embodiment, the reflective feature 74 can be disposed upon a lower surface of the transparent plate 72. In some embodiments, the signal from sensor 76 can be utilized to analyze a power output of the laser module 22. Having a reflective feature 74 disposed upon the lower surface of the transparent plate 72 would allow a power level to include attenuation through the transparent plate.

In the illustrated embodiment, an added reflective feature 75 is mounted below the transparent plate 72. This reflective feature 75 has an added benefit. As three-dimensional articles 14 are fabricated, a film of resin can build up on the lower surface of the transparent plate 72. This will attenuate light from the scan module 30. During operation, sensor 76 can monitor an intensity of radiation reflected by reflective feature 75. Controller 10 can receive a signal from sensor 76 and analyze that signal to determine a reduction in power level of beams 26 reaching the build plane 32. Then the controller 10 can increase an energy dosage in compensation and/or send a message to user interface 8 instructing a user to clean the transparent plate 72.

Also included is an inclinometer 78 that provides a signal to the controller 10 that is indicative of the orientation of the scan module 30 with respect to a gravitational reference. In one embodiment, the controller 10 is configured to provide instructions to a user for leveling portions of the three-dimensional printing system 2 in the event that a certain threshold is determined. In another embodiment, the controller 10 is configured to compensate for an angular tilt.

Figure 7:
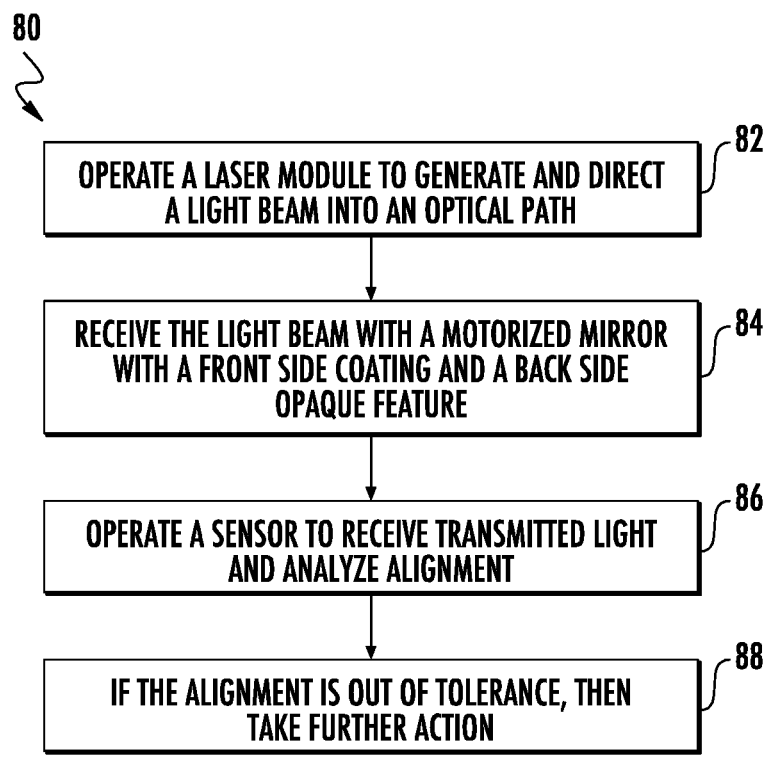
FIG. 7 is a flowchart depicting an embodiment of a method for aligning a light beam to a main optical path.
Figure 8:
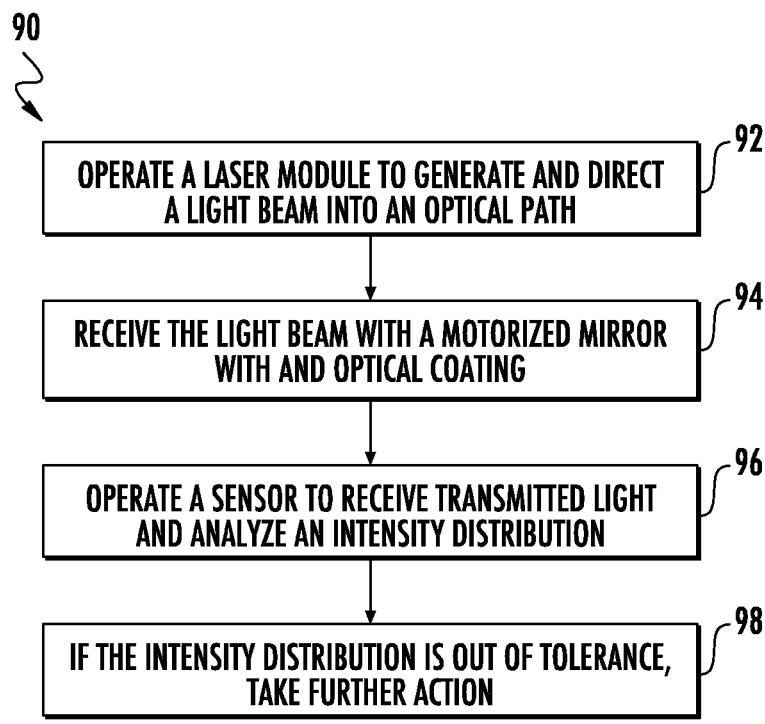
FIG. 8 is a flowchart depicting an embodiment of a method for analyzing a focus of a light beam.
Figure 9:
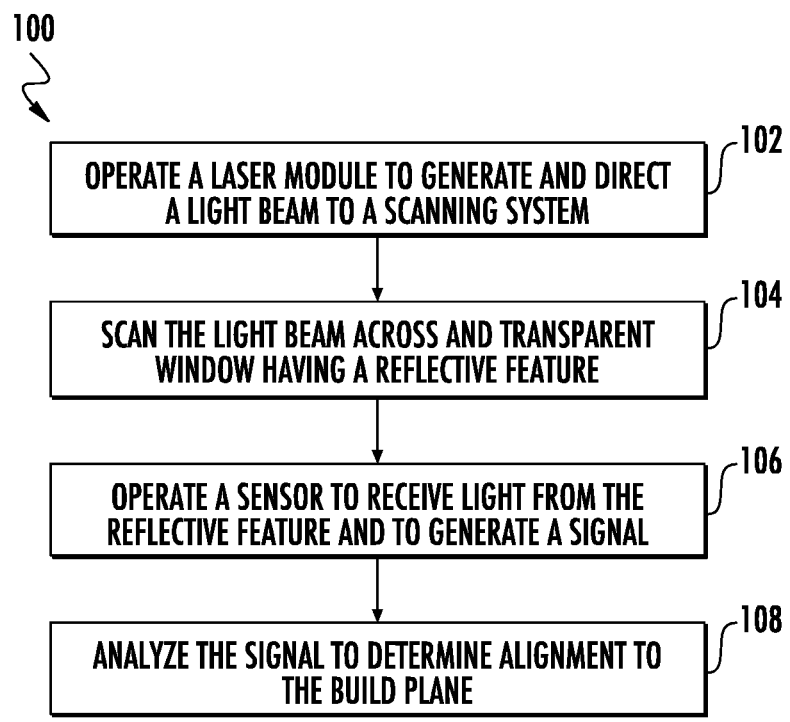
FIG. 9 is a flowchart depicting an embodiment of a method for aligning the scanning of a light beam to a build plane.

FIGS. 7, 8, and 9 are flowcharts describing methods for calibrating the three-dimensional printing system 2. The methods, described infra, are all performed by the controller 10. However, there may be manual processes associated with these methods.

FIG. 7 is a flowchart depicting an embodiment of a method 80 for aligning the light beam 26 to a main optical path 28. Method 80 should be performed whenever a new laser is installed into the laser module 22. Method 80 can also be performed continuously during operation of the three-dimensional printing system 2 in order to identify alignment drift so that corrective action can be taken.

According to 82, the laser module 22 is operated to generate and emit a light beam 26 along the main optical path 28. According to 84, the light beam 26 is received by a motorized mirror (e.g., X-mirror 42) having a front side optical coating 60 and a back side opaque feature 60. Less than 10% of the received radiative power is transmitted through the X-mirror 42. The X-sensor 48 receives at least some of the transmitted light along optical path 46.

According to 86, the X-sensor 48 is operated to receive transmitted light which includes a shadow from the opaque feature 62. Also, according to 86, the received light is analyzed to determine an alignment of the beam 26 with respect to the main optical path 28.

According to 88, a determination is made as to whether the alignment of beam 26 to optical path 28 is out of tolerance. If the alignment is out of tolerance, further action is also taken according to 88. The further action can include one or more of the following: (1) A message can be sent to the user interface 8 that alerts the user regarding the misalignment. (2) Instructions can be sent to user interface 8 that instruct the user to manually utilize aligner 24 to align the laser module 22. (3) Instructions can be sent to operate an automatic aligner 24 to automatically align the laser module 22.

FIG. 8 is a flowchart depicting an embodiment of a method 90 for characterizing the light beam 26 and taking further action as needed. According to step 92, the laser module 22 is operated to generate and emit a light beam 26 along the optical path 28. According to step 94, the light beam is received by a motorized mirror (e.g., Y-mirror 44) having a front side optical coating 66. Less than 10% of the received radiative power is transmitted through the Y-mirror. A sensor (e.g., Y-sensor 52) receives the transmitted radiation.

According to 96, the Y-sensor 52 receives the transmitted radiation and analyzes an intensity distribution. According to 98, a determination is made as to whether the light beam 26 is out of focus at the Y-sensor 52. If the light beam 26 is out of focus, then further action is take according to 98. The further action can include one or more of the following: (1) A message can be sent to the user interface 8 that alerts the user regarding the out of focus light beam 26. (2) Instructions can be sent to the user interface 8 for manually adjusting the focus. (3) A portion of the laser module 22 can be operated to auto-focus the light beam 26.

FIG. 9 is a flowchart depicting an embodiment of a method 100 for aligning a scanned light beam to a build plane using the apparatus depicted in FIG. 6. According to 102, the laser module 22 is operated to generate and emit a light beam 26 along the optical path 28 to the scanning system 30. According to 104, the scanning system 30 is operated to scan the light beam 26 across the transparent window 72. According to 106, the sensor 76 is operated to receive light from the reflective feature 74 and to generate a signal.

According to 108, the signal received from the sensor 76 is analyzed to align the light beam 26 to the reflective feature 74. In doing so, the light beam is aligned to the build plane 32.

In another embodiment, 108 includes determining a laser power from the signal. In some embodiments measurements can be taken at different laser power levels to provide a calibration at different power levels.

Figure 10:
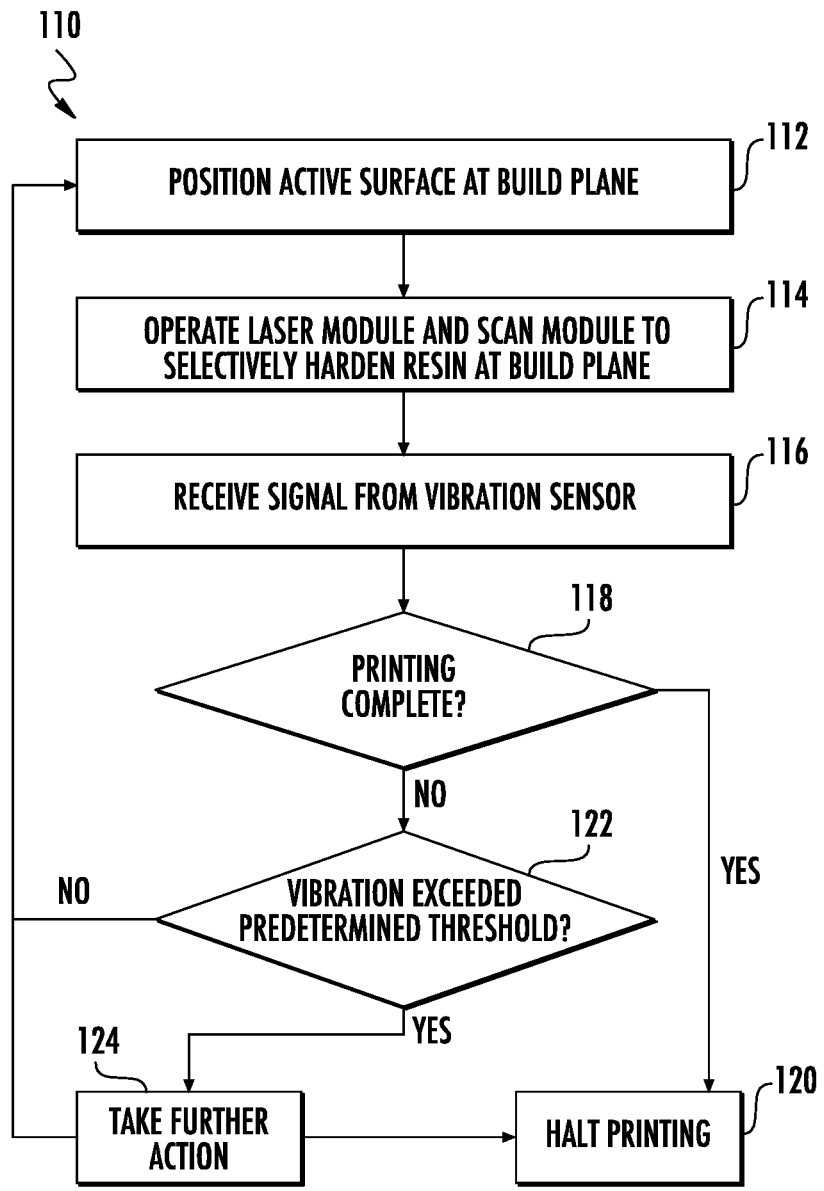
FIG. 10 is a flowchart depicting an embodiment of a method of operating the three-dimensional printing system.

FIG. 10 is a method 110 of manufacturing a three-dimensional article 14 using the three-dimensional printing system 2. According to 112, the controller positions active surface 17 at the build plane 32. As part of 112, a layer of resin 12 is dispensed or otherwise made to cover the active surface 17. According to 114, the laser module 22 and scan module 30 are operated to selectively polymerize the resin 12 at build plane 32.

According to 116, a signal is received from sensor 43. According to 118, a determination is made as to whether printing is complete. If so, printing is halted according to 120. If printing is not complete, then the signal is analyzed to see if the external vibration exceeded a predetermined threshold according to 122. If not, then the process loops back to 112 for the formation of another layer. If the threshold has been exceeded, then further action is taken according to 124.

The predetermined threshold for external vibration can be based on one or more factors. One factor is a peak magnitude or amplitude of the vibration. Another factor is a duration of the vibration. Yet another factor is an integration of vibrational energy over a certain time period.

Further action according to 124 can include one or more actions taken by the controller 10. A first action can be to halt the printing operation when the vibration is above a certain upper limit. Part of this first action can be to restart the printing operation when the vibration has fallen to a certain lower limit. A second action can be to store information concerning the vibration which can include one or more of a time stamp, a layer being formed, a position within the three-dimensional article, and a vibration factor such as one used for comparison with the threshold. A third action can be to send a warning to the user interface 8 that is indicative of a vibration being beyond a threshold or control limit.

In another implementation the further action vary depending upon more than one predetermined threshold being exceeded. A higher threshold can include halting the printing. A lower threshold can include storing information concerning the vibration.

In yet other embodiments, step 116 can include receipt of signals from other sensors. The further action 124 can include other adjustments such as adjustments in timing for alignment.

The exact sequence of method 110 can vary. For example, step 116 can occur concurrent with or between steps 112 and 114.

The specific embodiments and applications thereof described above are for illustrative purposes only and do not preclude modifications and variations encompassed by the scope of the following claims.

What is claimed:

1. A method of manufacturing a three-dimensional (3D) article comprising:
providing a three-dimensional (3D) printing system including a light engine configured to image a build plane, the light engine including a laser module, a scan module, a sensor, and a housing having an opening that is closed by a transparent plate, the transparent plate including a reflective feature in a generally known location;
operating the laser module to emit a light beam along an optical path from the laser module, through the scan module, through the transparent plate, and to the build plane;

operating the scan module to scan the light beam across the build plane, the light beam intersecting the reflective feature and reflecting a reflected portion of the light beam to the sensor;

receiving a signal from the sensor; and analyzing the signal to provide a determination of one or more of (1) a trajectory of the light beam during scanning and a (2) power level of the light beam received by the sensor; and wherein the reflective feature is formed upon an upper surface of the transparent plate, during operation of the laser module and the scan module light reflects from the transparent feature to the sensor without passing through the transparent plate.

2. The method of claim 1 wherein the reflective feature includes an array of reflective features having generally known locations corresponding to the build plane, the method includes correlating operation of the scan module with build plane locations.

3. The method of claim 1 wherein analyzing the signal includes a measurement of the trajectory of the light beam during scanning.

4. The method of claim 1 wherein an added reflective feature is disposed below the transparent plate, during operation of the laser module and the scan module light passes through the transparent plate, is reflected by the added reflective feature, and then passes a second time through the transparent plate.

5. The method of claim 4 wherein analyzing the signal includes a measurement of the power level of the light during scanning.

6. The method of claim 1 wherein the reflective feature is a dot having an axial dimension, the light beam impinging on the transparent plate with an impinging diameter that is at least ten times the axial dimension of the dot.

7. The method of claim 1 wherein the 3D printing system includes a resin vessel configured to contain photocurable resin and a motorized build platform, the method including operating the laser module, the scan module, and the motorized build platform to manufacture the 3D article.

8. The method of claim 7 wherein during operation of the laser module, the scan module, and the motorized build platform to manufacture the 3D article the transparent plate provides a dual function of blocking vapors to protect the scan module and to provide the reflective feature for analyzing the signal.

9. The method of claim 7 further including estimating a power level attenuation effect of a resin film that has accumulated on a lower side of the transparent plate based upon the power level of the light beam received by the sensor.

10. The method of claim 9 further comprising adjusting an energy level delivered by the laser module in response to estimating the power level attenuation effect of the resin film.

11. The method of claim 9 further comprising sending an alert or message to a user interface when the power level attenuation reaches a threshold level.

12. A method of manufacturing a three-dimensional (3D) article comprising:

providing a three-dimensional (3D) printing system including a light engine configured to image a build plane, the light engine including a laser module, a scan module, a sensor, and a housing having an opening that is closed by a transparent plate, the transparent plate including a reflective feature in a generally known location;

operating the laser module to emit a light beam along an optical path from the laser module, through the scan module, through the transparent plate, and to the build plane;

operating the scan module to scan the light beam across the build plane, the light beam intersecting the reflective feature and reflecting a reflected portion of the light beam to the sensor;

receiving a signal from the sensor;

analyzing the signal; and analyzing the signal includes one or more of (1) aligning scan module to the build plane and (2) estimating an attenuation of light passing through the transparent plate and to the build plane and;

wherein the reflective feature is formed upon an upper surface of the transparent plate, during operation of the laser module and the scan module light reflects from the transparent feature to the sensor without passing through the transparent plate.

13. The method of claim 12 wherein analyzing the signal includes aligning the scan module to the build plane.

14. The method of claim 12 wherein an added the reflective feature is disposed below the transparent plate, during operation of the laser module and the scan module light passes through the transparent plate, is reflected by the added reflective feature, and then passes a second time through the transparent plate.

15. The method of claim 14 wherein analyzing the signal includes estimating an attenuation of light passing through the transparent plate and to the build plane.

16. The method of claim 15 further comprising adjusting an energy level delivered by the laser module in response to estimating the attenuation.

17. The method of claim 15 further comprising sending an alert or message to a user interface when an estimated attenuation exceeds a predetermined threshold.

18. The method of claim 12 wherein analyzing the signal includes both of (1) aligning scan module to the build plane and (2) estimating an attenuation of light passing through the transparent plate and to the build plane.

* * * * *